United States Patent [19]
Townsend

[11] 3,895,388
[45] July 15, 1975

[54] ADAPTIVE ILLUMINATOR

[75] Inventor: Van Winkle Todd Townsend, Olney, Md.

[73] Assignee: International Business Machines Corporation, Armonk, N.Y.

[22] Filed: Oct. 25, 1973

[21] Appl. No.: 409,525

[52] U.S. Cl. ............... 354/132; 354/65; 178/6.7 R
[51] Int. Cl. ..................... G03b 29/00; G03b 15/02
[58] Field of Search ..................... 95/11.5 R, 12.5; 178/6.7 R

[56] References Cited
UNITED STATES PATENTS

| | | | |
|---|---|---|---|
| 3,294,002 | 12/1966 | Vitkine | 95/11.5 R |
| 3,380,358 | 4/1968 | Newmann | 95/11.5 R |

*Primary Examiner*—Robert P. Greiner
*Attorney, Agent, or Firm*—J. Jancin, Jr.; John E. Hoel

[57] ABSTRACT

An adaptive illuminator is disclosed for an active range gated imaging system, designed to operate at small slant angles, when carried in an aircraft or on the mast of a ship or land based observation port. Active TV operation at small depression angles creates an elongated profile of illumination on horizontal terrain. In normal operation, using wide range-gating pulses to the camera, the foreground of the profile is over-illuminated while the background is under illuminated creating poor image quality. When narrow gates are used in the camera to improve the signal-to-noise ratio, all of the picture, except a narrow horizontal band in the center of the field of view, is eliminated. The constant irradiance adaptive illuminator disclosed herein, provides both spatial and temporal variations in the illuminator intensity to achieve a constant irradiance along the illuminated terrain with a minimum spread in the time of arrival of the reflected light to the camera. This is accomplished by dividing the illuminator source into a number of horizontal segments which are sequentially driven. The array of illuminator segments are sequentially energized so that the light illuminating the foreground is produced later in time than the light illuminating the background. As a result, the reflections from the entire field of view return to the camera at about the same time allowing the range gate for the camera to be much narrower than ordinarily possible, providing an improved signal-to-noise ratio, but without the undesirable effect of gating out portions of the picture. The slant compensation means automatically adjusts the trigger delays for each array driver as a function of the slant angle of the platform for the optical head. At the same time, the segments illuminating the foreground are operated at proportionally lower average powers to provide only a slight stepwise variation in the scene irradiance over the entire field of view.

8 Claims, 4 Drawing Figures

ADAPTIVE ILLUMINATOR

FIELD OF THE INVENTION

The invention disclosed herein relates to systems for the detection of moving or stationary objects from either a moveable or fixed location and more particularly relates to a range gated imaging system.

BACKGROUND OF THE INVENTION

An imaging system usually includes a sensor such as a TV camera or other scanner, an image converter, or point locator. An active imaging system is composed of a sensor and a synchronized illuminator for illuminating the scene to be recorded by the sensor. In an active, range gated imaging system, the operation of the sensor is delayed for a time of approximately the time of flight of light from the illuminator to the scene and back to the sensor to gate out foreground back scattered light.

Prior art active range gated imaging systems are directed to the simultaneous, total illumination of the field of view, such as is disclosed in U.S. Pat. No. 3,380,358 to Newmann. Newmann discloses a range gated imaging system in which a Q-switched ruby laser illuminates objects to be photographed with a 60 nanosecond illuminating pulse of energy. Through a controlled delay the shutter grid of an image converter camera tube is opened for 50 nanoseconds after an elapsed time corresponding to the travel time of the energy pulse from the laser to the object to be viewed and return. Thus, the image formed by the camera is not degraded by the unwanted reflections of nearer and farther objects such as fog or haze. The active television system disclosed by Newmann can provide good imagery under adverse weather conditions. However, in applications where the active range gated imaging system must operate at shallow depression angles, such as when viewing a ground level object from an elevated vantage point such as an aircraft, ship mast or land based observation post, an elongated profile of illumination on the horizontal terrain is created. If wide range gates are used to view the entire scene, the light scattered from the intervening ambient degrades the signal-to-noise ratio of the image received by the camera. Moreover, the foreground of the profile is over illuminated while the background is under illuminated, creating poor image quality. If narrow range gates are employed in the camera to improve the signal-to-noise ratio, all of the picture, except a narrow horizontal band in the center of the field of view, is eliminated. This is the problem which presently confronts the art.

OBJECTS OF THE INVENTION

It is an object to operate an active range gated imaging system at shallow depression angles so as to receive the entire field of view while reducing the image degrading effects of ambient backscatter.

It is another object of the invention to operate an active range gated imaging system at shallow depression angles so as to create a constant irradiance of the terrain within the field of view.

SUMMARY OF THE INVENTION

These and other objects are accomplished by the adaptive illuminator invention which provides spatial and temporal variations in the intensity of the illuminator source so as to achieve a constant irradiance along the illuminated terrain with a minimum spread in the time of return of the reflected wave fronts to the camera. This is accomplished by dividing the illuminator source into a number of horizontal segments which are driven sequentially. The array of segments are energized successively so that the light illuminating the foreground is produced later than the light illuminating the background. As a result, the reflections from the entire field of view return to the camera at about the same time allowing the camera range gate to be much narrower than ordinarily possible, providing an improved signal-to-noise ratio but without the undesirable effect of gating out portions of the picture. The slant compensation electronics automatically adjust the trigger delays for each array driver as a function of the depression or slant angle of the horizontal reference platform so that the reflections from the terrain arrive simultaneously without operator adjustment. At the same time, the segments illuminating the foreground are operated at proportionally lower average powers to provide only a slight stepwise variation in the scene irradiance over the entire field of view.

DESCRIPTION OF THE DRAWINGS

The foregoing and other objects, features and advantages of the invention will be apparent from the following more particular description of the preferred embodiments of the invention, as illustrated in the accompanying drawings.

DISCUSSION OF THE PREFERRED EMBODIMENT

In a range gated, active imaging system, the object to be imaged is illuminated with a very short pulse of light, the camera shutter remaining closed until the light reflected from the object reaches the camera. Light returned from the objects such as fog, haze and rain which reside at a shorter range, arrive before the shutter of the camera opens, and is therefore, rejected. The signal-to-noise ratio of the image recorded by the camera during the period the shutter is open is, therefore, substantially higher than it would be if the shutter remained open from the time the light pulse initially issued from the illuminator. As is seen from the diagram in FIG. 1, the operation of an active TV system at a small depression angle alpha when carried on board the airplane 2, creates an elongated illuminated profile of the horizontal terrain 3. As an example, a conventional system having a field of view angle $\theta$ of 3.5° and viewing at a minus 15° slant angle alpha and a nominal slant range $R_n$ of 3 Km., the horizontal terrain will be illuminated for a distance about 700 meters with the foreground receiving more than 50% greater irradiance than the background. This will result in the television display "blooming" on the scene highlights. With a 1 microsecond range gated illuminator pulse, the camera gate would have to be opened for a duration of 5.6 microseconds to view the total area.

Figure 2:
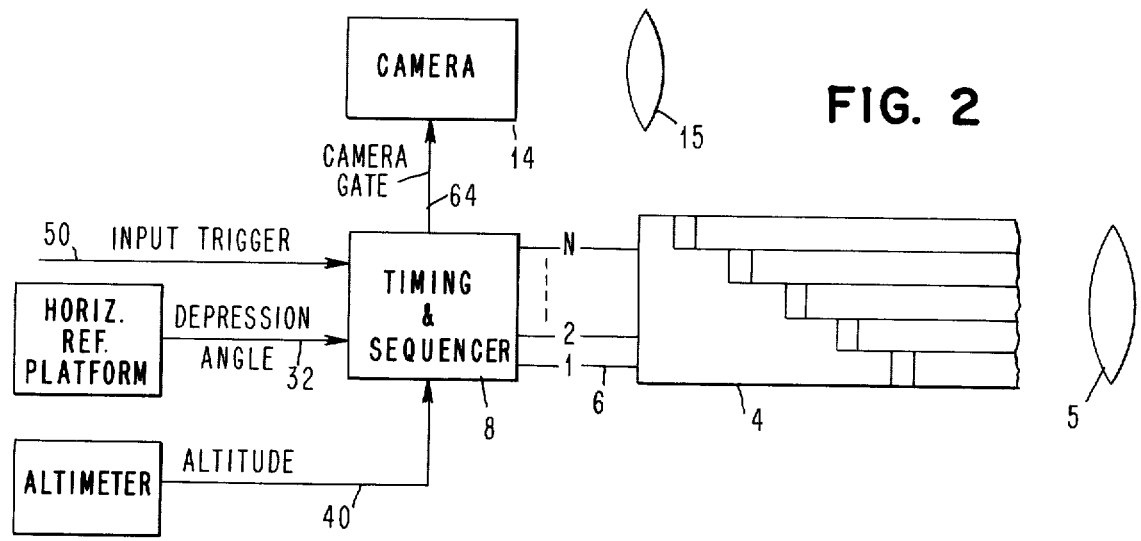
FIG. 2 is a system block diagram of the adaptive illuminator invention.

FIG. 2 shows the adaptive illuminator system in which the 10 segment illuminator source 4 contains an array of gallium arsenide laser diodes which are sequentially pulsed by the timing and sequencer block 8 so that the diodes illuminate at sequentially smaller slant ranges, the pulses being delayed by the delay time $T_n$ where $T_n$ equals $2(R_1-R_n)/C$ and $R_n$ equals $h\ CSC\ \phi_n$. $h$ is the altitude of the aircraft. $R_n$ is the slant range of an illuminated ground area increment $a_n$. $\phi_n$ is the slant angle of the slant range $R_n$. $C$ is the velocity of light. $T_n$ is the delay in seconds for pulsing the nth illuminator diode with respect to the time of pulsing the first illuminator diode. The angle $\phi_n$ is related to the slant angle alpha and the field of view angle $\theta$ as:

$$\phi_n = \text{alpha} - [\theta/2-(n-1)/(N-1)\theta].$$

The operation of the adaptive illuminator proceeds as follows. An input trigger pulse may be derived from a manual input or from the horizontal sync pulse for the television camera 14. The timing and sequencer block 8 accepts from the horizontal reference platform on which is mounted the optic head 4, the slant angle information. A signal from an altimeter is accepted over line 40. The timing and sequencer 8 processes this data so as to yield power pulses over the lines 6 to the diode array on the optics head 4, sequentially energizing the diodes so as to sequentially illuminate the respective ground incremental areas on the terrain in accordance with the above equations. After a time delay of $T_c = 2R_1/C$ after the input trigger pulse is received over line 50, a camera gating pulse is issued by the timing sequencer block 8 over the line 64 to the camera 14, thereby opening the camera shutter for the duration of the input trigger pulse.

Figure 3:
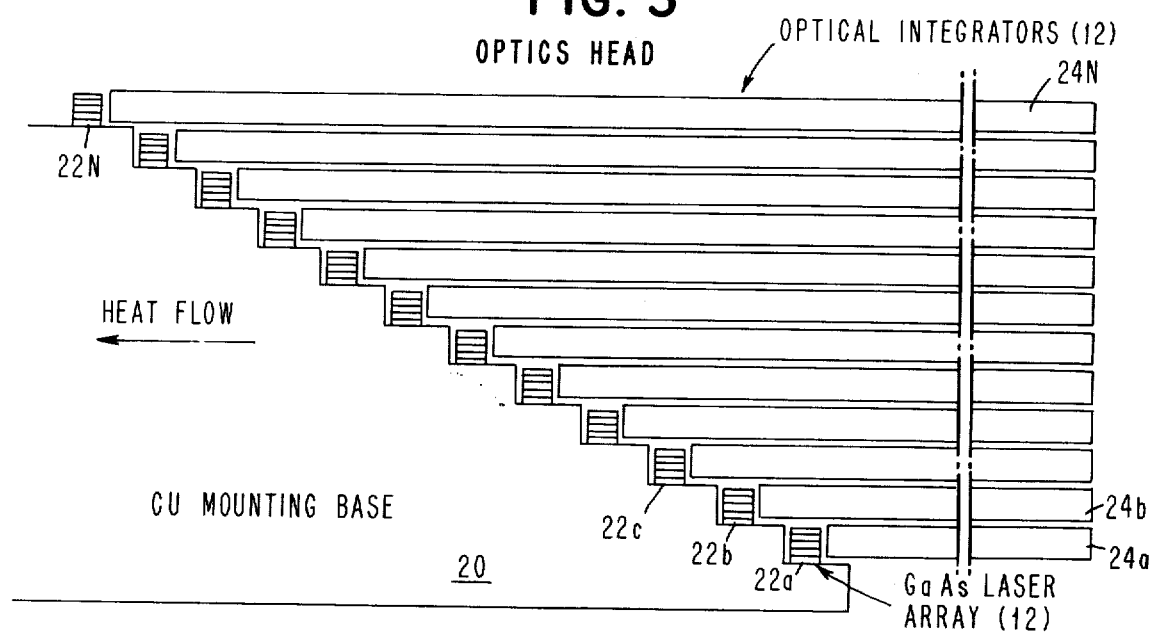
FIG. 3 is a detailed illustration of the optic head for the adaptive illuminator invention.

FIG. 3 is a more detailed illustration of the optics head for the adaptive illuminator. The sequential power pulses delivered over the lines 6 sequentially energize the gallium arsenide laser diodes 22A–22N, so that the light illuminating the foreground of the terrain is produced at a later time than that illuminating the background. As a result, the reflections from the entire field of view return to the camera 14 at about the same time allowing the range gate for the camera to be much narrower than ordinarily possible. The slant compensation electronics in the timing and sequencer block 8 automatically adjust the trigger delays in accordance with the above equations, as the function of the respective slant angles $\phi_n$ so that the reflections arise simultaneously without operator adjustment. Each laser diode 22A, 22B, etc., in the laser diode array on the mounting base 20, is gallium arsenide infrared diode stack. The optics head contains in addition to the array of diodes 22, an array of optical integrators 24A–24N. Light output from the laser diode is directed into the integrator, the exit aperture of which forms a source of uniform intensity. The lens 5 focuses the radiation emitted from each respective integrator 24A–24N onto each of a sequence of adjacent ground area increments A1–$A_N$ along the ground terrain 3.

Figure 1:
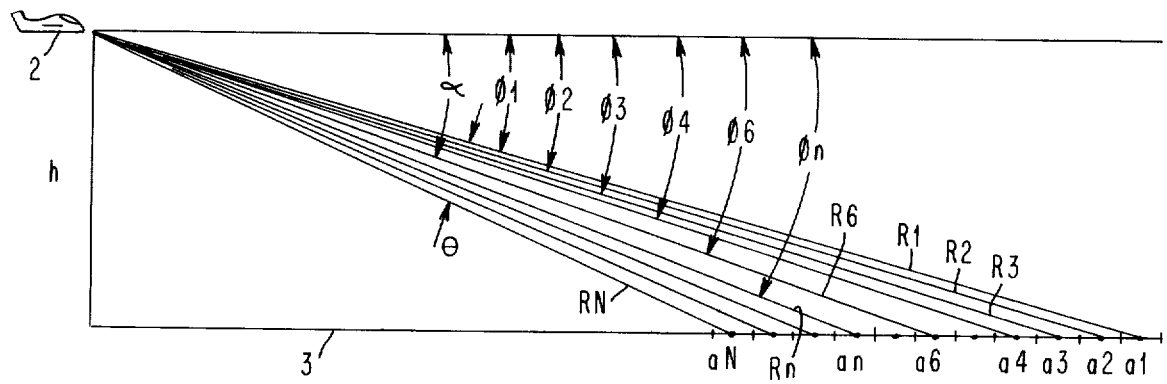
FIG. 1 depicts the geometric arrangement of an airborne, active range gated imaging system and the terrain to be imaged.
Figure 4:
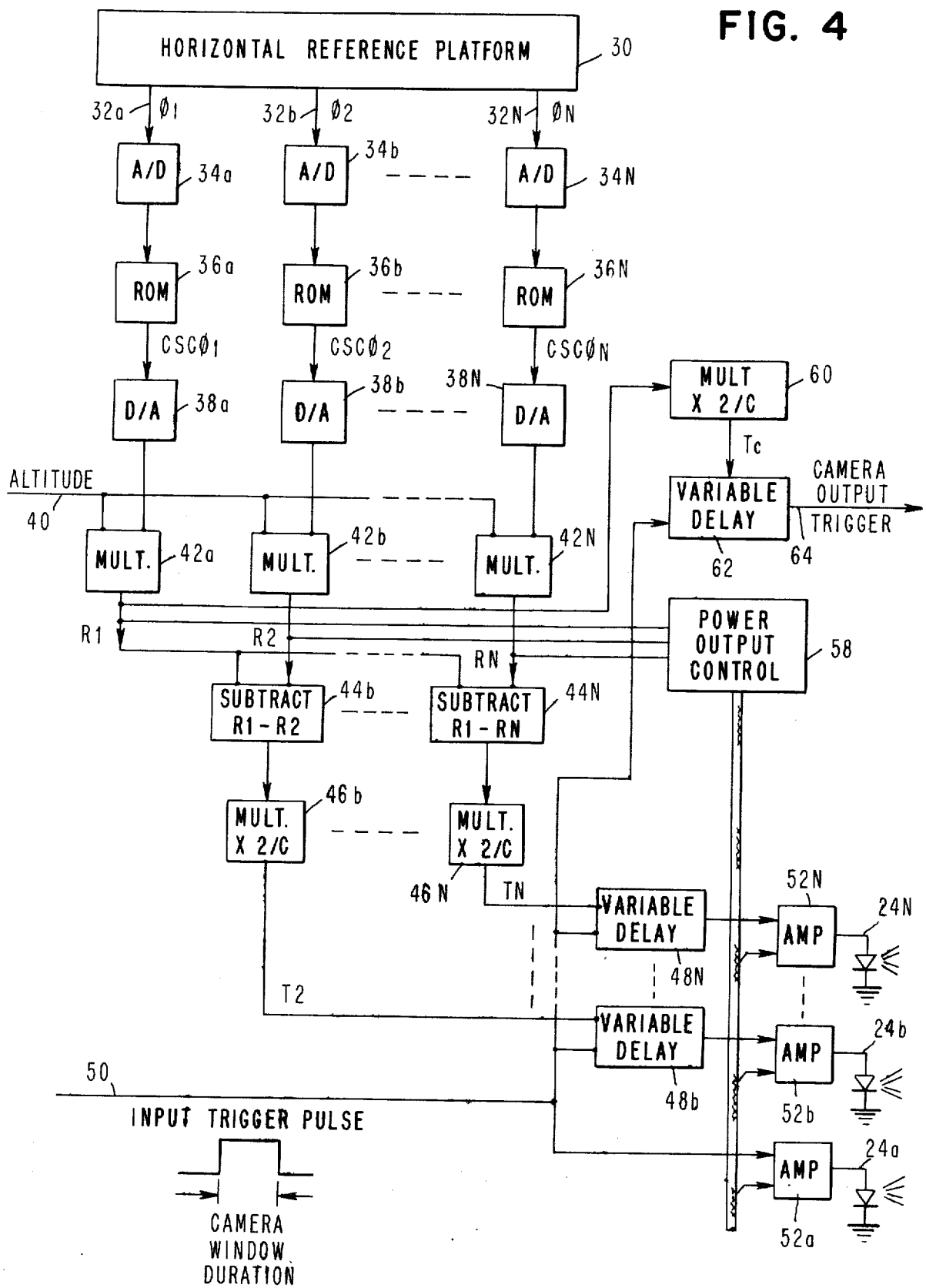
FIG. 4 is a more detailed system diagram of the adaptive illuminator invention.

A more detailed diagram of the adaptive illuminator system is shown in FIG. 4. The adaptive illuminator optics head 4 is mounted on a horizontal reference platform 30 which may be a gimballed platform having angle transducers thereon. The horizontal reference platform orients the optics head 4 so that the central direction of illumination which, in FIG. 1, is $R_6$, can assume selected slant angles. The angle transducers on the horizontal reference platform, convert to analog electrical signals, the slant angles $\phi_1-\phi_n$, which angular signals are transmitted over lines 32A–32N to the analog-to-digital converters 34A–34N. The analog-to-digital converters 34 output the digital representation for the respective slant angles $\phi_n$ to the read only memory 36A–36N from which is accessed the digital value of the cosecant of $\phi_n$, the value of which is outputted to the digital-to-analog converter 38A–38N which outputs the electrical analog signal whose magnitude is proportional to that trigonometric value. The analog value for the altitude of the aircraft derived from an altimeter, is inputted on line 40 and the product of that altitude and the cosecant of $\phi_n$ is taken in the multiplier 42A–42N. The output of the multiplier 42a is the slant range $R_1$ between the aircraft and the farthest illuminated ground incremental area $A_1$. The output of the multiplier 42b is $R_2$ which is the slant range between the aircraft and the second farthest ground elemental area $a_2$. And so forth, with the output of the multiplier 42N being the value $R_N$ which is the slant range between the aircraft and the nearest ground elemental area $a_N$. From the analog value of $R_1$ is subtracted the analog value of $R_2$ in the subtract block 44b, the difference of which is outputted to the multiplier 46b, that difference being multiplied therein by the quantity $2/c$. The output of the multiplier 46b is the analog value of the decay time $T_2$ which is twice the time of flight of light over the distance equal to the difference between the slant range $R_1$ and the slant range $R_2$. Similarly, the delays $T_3, T_4, \ldots T_N$ are calculated in their respective subtract blocks 44C–44N and multiplication blocks 46C–46N as is shown in FIG. 4. The output from the multiplication block 46b–46N is an analog signal which is inputted to the variable delay 48b–48N, which can delay an input trigger pulse signal on line 50 for a duration which is a function of the amplitude of the analog signal $T_2$ to $T_N$. The input trigger pulse on line 50 has a time duration equal to the duration that the shutter is to be open in the camera 14. This may also be the duration over which the respective illuminator diodes are to be energized. The input trigger pulse on line 50 is amplified in the amplifier 52a and energizes the first laser diodes 24a to illuminate the ground incremental area $a_1$. At the same time, the input trigger pulse on line 50 is present at the input of the variable delay 48b. The input trigger pulse is delayed in the variable delay 48b by a duration $T_2$ before being outputted to the amplifier 52b for the energization of the laser diode 24b. And so on, the input trigger pulse on line 50 simultaneously appearing at the input of the variable delay 48N and being delayed by the duration $T_N$, thereafter being outputted to the amplifier 52N and energizing the laser diodes 24$_N$. The respective delays $T_2-T_N$ cause the sequential issuance of light beam pulses for sequentially illuminating the respective ground incremental areas $a_2-a_N$ of FIG. 1 such that the light reflected from each of the respective illuminated ground incremental areas collectively form a common wave front which simultaneously impinges upon the camera 14 on board the aircraft 2.

The analog value $R_1$ which is outputted from the multiplier 42$_a$ is inputted to the multiplier 60 which multiplies the value of $R_1 \times 2/c$ and outputs the product as the analog value $T_c$ which is the camera shutter delay and is twice the time of flight of light over the slant range $R_1$. The analog value of $T_c$ is inputted to the variable delay 62. This delays the input trigger pulse on line 50 by the duration $T_c$, which thereafter is outputted on line 64 as the camera output trigger pulse is directed to the shutter on camera 14. The shutter on camera 14 opens at the time of arrival of the collective wave front for the reflected wave from the ground incremental areas A1–AN, the camera shutter remains open for the duration of the camera output trigger pulse on line 64.

In addition to compensating for the time of flight delay of light reflected from the respective ground incremental areas A1–AN, the adaptive illuminator system can compensate for variations in the irradiance which reaches each of the respective ground incremental areas. This function is accomplished by the power output control 58 which accepts from the respective multipliers 42A–42N the analog values $R_1$–$R_N$ for the respective slant range distances from the aircraft to the respective ground incremental areas $A_1$–$A_N$. The irradiance E incident on a ground incremental area An is proportional to $I/R_n^2$, where $I$ equals the intensity of the illuminator source. To compensate for this variance, the power output control 58 controls each respective amplifier 52a–52n so as to introduce a relative increase in the optical power output of each respective diode stack 24a–24N in proportion to the second power of the slant range $R_1$ to $R_N$. Thus, the adaptive illuminator on board the airplane 2 generates a constant irradiance within the field of view on the terrain 3.

An additional correction to the relative power output per segment may be necessary to compensate for atmospheric transmission losses due to scattering or absorption, which reduces the irradiance on the An ground element by $e^{-KR_n}$, where $K$ is the atmospheric extinction coefficient. A correction factor of $e^{2KR_n}$ can be applied by the amplifiers 52a–52n under the control of power output control 58, so as to introduce a relative increase in the optical power output of each respective diode stack 24a–24n. Thus, the effect of atmospheric attenuation is reduced.

The duration of the sensor gate may be varied in the adaptive illuminator system to vary the range of observation. The operation of the adaptive illuminator is typically synchronized with the TV horizontal line scan in the camera 14. The active TV system created by the combination of these basic units provides high resolution images with significant signal-to-noise improvement by reduction of back scatter due to adverse weather conditions or aerosols during operation from an aircraft at small slant angles.

While the invention has been particularly shown and described with reference to the preferred embodiment thereof, it will be understood by those skilled in the art that the foregoing and other changes in form and details may be made therein without departing from the spirit and scope of the invention.

I claim:

1. A range gated illuminator with compensation for variations in slant range within the field of illumination, comprising:

an airborne illuminator head having a sequence of $n$ laser diodes capable of independent energization, each diode oriented so as to illuminate one of a sequence of adjacent ground range incremental areas along a sequence of adjacent predetermined slant angle increments about a central direction of illumination;

a mounting means suspending said illuminator head from the aircraft and orienting the head so that said central direction of ilumination can assume selected slant angles;

an angle transducer means coupled to said mounting means for converting to an angle signal, the slant angle at which said central direction of illumination for said head is oriented;

a range gated camera mounted on board said aircraft and oriented with its field of view to coincide with said n illuminated ground range incremental areas;

a variable delay means with an input connected to said transducer means for converting said angle signal into n sequentially delayed power pulses in response to an input trigger pulse whose duration is shorter than the time of flight of light from said aircraft to the ground along said central axis of illumination;

said variable delay means having n outputs, each connected respectively to one of said n laser diodes, for transmitting said power pulses to sequentially energize each laser diode in the order of increasing slant angle;

said power pulses each being delayed respectively by a time duration approximately equal to twice the time of flight of light over a distance approximately equal to the difference in slant range between a given illuminated ground incremental area and the illuminated ground incremental area having the smallest slant angle;

said variable delay means having a camera trigger output connected to said range gated camera for transmitting said input trigger pulse, to trigger said camera after a delay whose duration is approximately equal to twice the time of flight of light from said aircraft to said illuminated ground range incremental area having the smallest slant angle;

whereby said range gated camera can record the image of a uniformly illuminated field of view at a small slant angle.

2. In the range gated illuminator of claim 1, wherein the variable delay means further comprises:

means for varying the amplitude of said sequence of power pulses in approximately the proportion of the respective slant range to the second power, so that light incident on each ground incremental area illuminated is of uniform irradiance.

3. A range gated illuminator with compensation for variations in slant range within the field of illumination, comprising:

an airborne illuminator head having a sequence of $n$ laser diodes capable of independent energization, each diode oriented so as to illuminate one of a sequence of adjacent ground range incremental areas along a sequence of adjacent predetermined slant angle increments about a central direction of illumination;

a mounting means suspending said illuminator head from the aircraft and orienting the head so that said central direction of illumination can assume selected slant angles;

an angle transducer means coupled to said mounting means for converting to $n$-1 angle signals, the slant angles at which the direction of illumination for each of said diodes is oriented;

a range gated camera mounted on board said aircraft and oriented with its field of view to coincide with said n illuminated ground range incremental areas;

a variable delay means with an input connected to said transducer means for converting said $n-1$ angle signals into $n-1$ sequentially delayed power pulses in response to an input trigger pulse whose duration is shorter than the time of flight of light from said aircraft to the ground along said central axis of illumination;

said variable delay means having n outputs, each connected respectively to one of said $n$ laser diodes, for transmitting said $n-1$ power pulses and said input trigger pulse to sequentially energize each laser diode in the order of increasing slant angle;

said power pulses each being delayed respectively by a time duration approximately equal to twice the time of flight of light over a distance approximately equal to the difference in slant range between a given illuminated ground incremental area and the illuminated ground incremental area having the smallest slant angle;

said variable delay means having a camera trigger output connected to said range gated camera for transmitting said input trigger pulse, to trigger said camera after a delay whose duration is approximately equal to twice the time of flight of light from said aircraft to the illuminated ground range incremental area having the smallest slant angle;

whereby said range gated camera can record the image of a uniformly illuminated field of view at a small slant angle.

4. In the range gated illuminator of claim 3, wherein the variable delay means further comprises:

means for varying the amplitude of said sequence of power pulses in approximately the proportion of the respective slant range to the second power, so that light incident on each ground incremental area illuminated, is of uniform irradiance.

5. In the range gated illuminator of claim 3, wherein the variable delay means further comprises:

means for varying the amplitude of said sequence of power pulses in approximately the proportion of the natural number e raised to the power equal to twice the respective slant range times the atmospheric extinction coefficient, so that light reflected from each ground incremental area illuminated, manifests substantially no variation in intensity due to atmospheric attenuation.

6. A method for compensating for variations in the time of arrival of light reflected from terrain within the field of view of an elevated, active, range gated camera, comprising the steps of:

directing an array of $n$ light sources located in the vicinity of said elevated camera, onto said terrain within said field of view of said camera;

each of said light sources being directed to a separate one of $n$ terrain elemental areas within said field of view, which form successively adjacent strips each having a substantially uniform slant range;

energizing a first one of said $n$ light sources directed to a first one of said n terrain elemental areas having the largest slant range;

delaying the energization of a second one of said n light sources directed to a second adjacent one of said $n$ terrain elemental areas having the second largest slant range, with respect to the time of energization of said first light source, for a duration approximately equal to twice the difference between said first and second slant ranges divided by the speed of light;

repeating the steps of delaying the energization of a next one of said $n$ light sources directed to a next adjacent one of said n terrain elemental areas having a next largest slant range, with respect to the time of energization of said first light source, for a duration approximately equal to twice the difference between said first and said next slant ranges divided by the speed of light, until all $n$ of said light sources have been so energized;

delaying the commencement of operation of said range gated camera with respect to the time of energization of said first light source, for a duration approximately equal to twice said first slant range divided by the speed of light;

whereby said $n$ terrain elemental areas are sequentially illuminated in the order of greatest to least slant range, by said $n$ light sources so that the light reflected from each of said $n$ terrain elemental areas arrives at said elevated camera at substantially the same time as said camera commences operation.

7. The method of claim 6, wherein each step of energization of one of said $n$ light sources includes the step, comprising:

amplifying the light emitted from each light source in approximately the proportion of the respective slant range to the second power;

whereby the light incident on each of said terrain elemental areas is of uniform irradiance.

8. The method of claim 6, wherein each step of energization of one of said $n$ light sources includes the step, comprising:

amplifying the light emitted from each light source in approximately the proportion of the natural number e raised to the power equal to twice the respective slant range times the atmospheric extinction coefficient;

whereby the light reflected from each of said terrain elemental areas illuminated, manifests substantially no variations in intensity due to atmospheric attenuation.

* * * * *